Dec. 18, 1934. J. C. MARTIN, JR Re. 19,399
VALVE
Original Filed Dec. 31, 1927 2 Sheets-Sheet 1
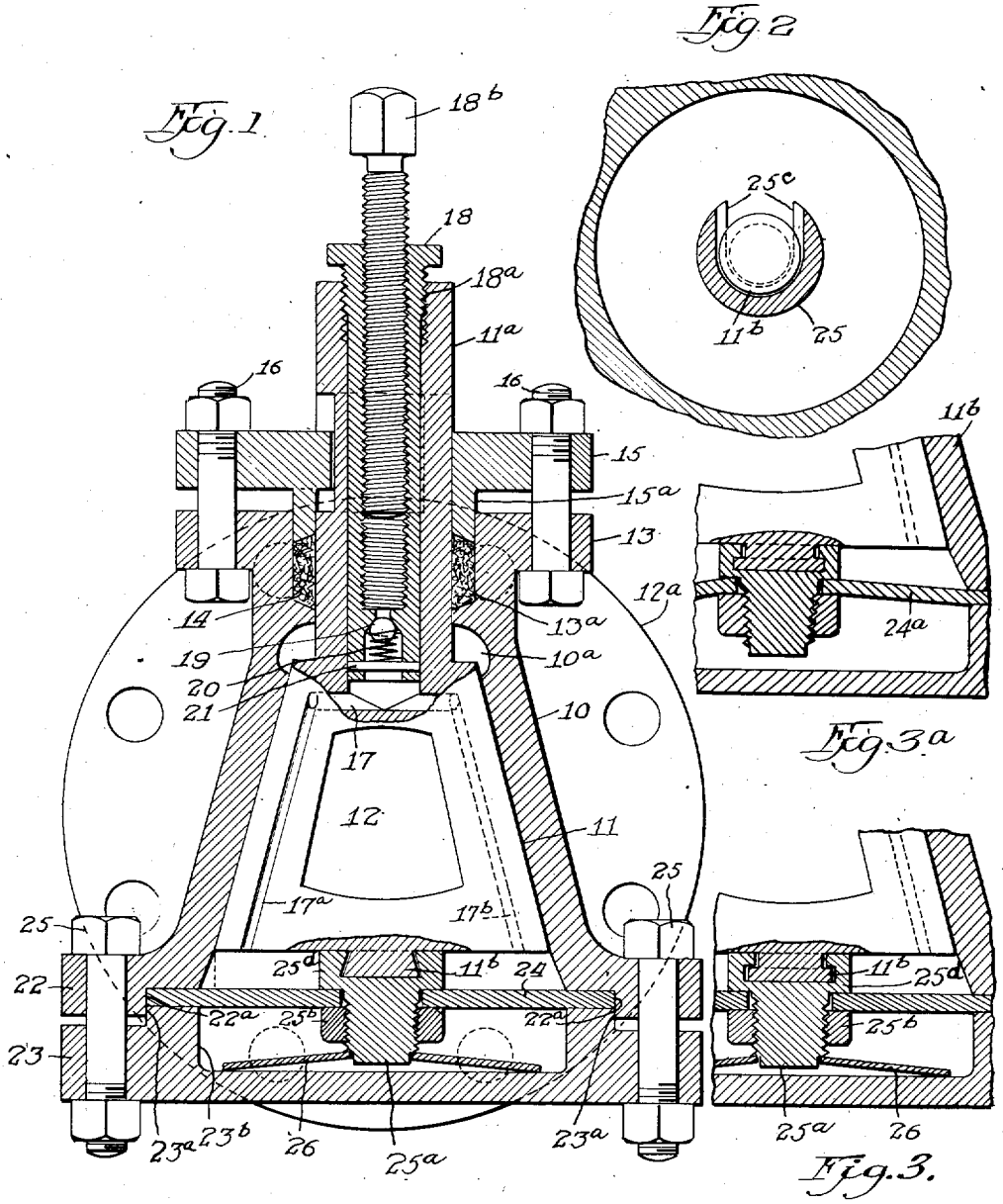
Witness:
Inventor:
Grover C. Martin Jr
by attorney
Pore Carpenter Dec. 18, 1934. J. C. MARTIN, JR Re. 19,399

VALVE

Original Filed Dec. 31. 1927 2 Sheets-Sheet 2

Witness:

Fred. E. Dorsey

Inventor

Jesse C. Martin Jr.
by attorney
Paul Carpenter

Reissued Dec. 18, 1934 Re. 19,399

UNITED STATES PATENT OFFICE 19,399

VALVE

Jesse C. Martin, Jr., Los Angeles, Calif., assignor to Walworth Patents Inc., Boston, Mass., a corporation of Massachusetts Original No. 1,851,259, dated March 29, 1932, Serial No. 243,992, December 31, 1927. Application for reissue November 28, 1933, Serial No. 700,152

31 Claims. (Cl. 251—93)

The present invention relates in general to valves and more particularly to valves having a lubricant introduced between the valve member and the valve seat, and has special reference to the provision of an improved type of plug valve of the character referred to, wherein lubricant is employed to prevent sticking of the valve upon its seat and to prevent leakage of fluid therebetween.

Among the more important objects of the present invention are the provisions of an improved means for introducing a lubricant into a valve mechanism, particularly, a valve of the well known turning plug type; the provision of an improved valve structure and lubricating means therefor incorporating therein auxiliary means for lifting the valve from its seat by the action of the lubricant under pressure; the provision of an improved means for maintaining a supply of the lubricant in effective position; the provision in a lubricated valve of an improved construction of lubricant chamber whereby to increase the capacity of the chamber and thereby increase the intervals to which it is necessary to replenish the lubricant; the provision in an improved valve structure of an improved pressure sensitive element for displacing the valve away from its seat to permit the introduction of a lubricant to the seating surface of the valve and casing; the provision of an improved means for permitting of the simplified adjustment of the valve structure and lubricating means; the provision of a lubricated plug valve structure incorporating therein an improved arrangement whereby cleaning and repairing of the parts is facilitated; and the provision of a valve of the character referred to wherein the means for holding the valve normally on its seat is excluded from contact with the contents of the pipe line.

The foregoing and such other objects and advantages as may appear or be pointed out as this description proceeds, are attained in the structural embodiment illustrated in the accompanying drawings, in which:

Figure 1 is a vertical sectional view of one form of my invention taken in a plane along the axis of the valve plug.

Figure 2 is a view showing details of construction of Figure 1 along lines 2—2.

Figure 3 is a modified structure for maintaining the valve plug in proper position.

Figure 3*a* is a view similar to Figure 3 of a further alternative form of the invention.

Figure 4:
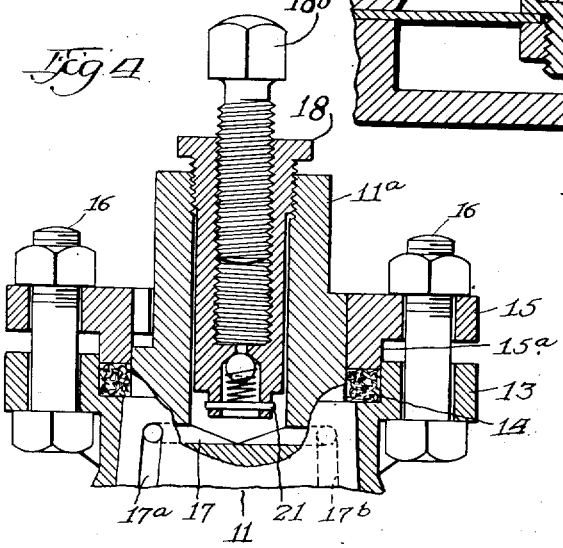

Figure 4 is a vertical sectional view showing details of construction of one form of my invention for supplying lubricant to the valve under pressure.

Figure 5:
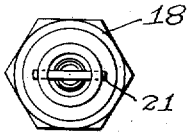

Figure 5 is an end view of the compressor-screw arrangement shown in Figure 4.

Figure 6:
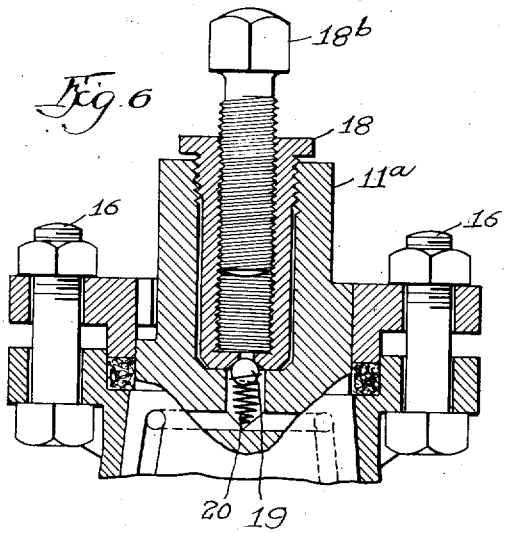

Figure 6 shows a modified structure for supplying lubricant to the valve under pressure.

Figure 7:
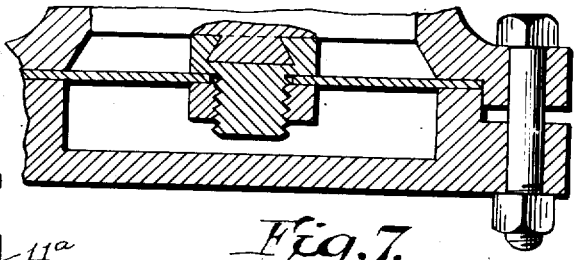

Figure 7 is a further alternative form of this invention.

Referring to the drawings, my invention comprises a valve body 10 having mounted therein a tapered plug 11. Body 10 is provided on its interior with an annular recess 10*a* to facilitate the accurate machining of the valve seat and to prevent interference between the upper end of the plug 11 and the wall of body 10.

The plug 11 is provided on its upper end with a tubular extension 11*a* which constitutes an operating stem for the plug.

The upper end of stem 11*a* may be suitably shaped for the application of a wrench or other instrument to facilitate the turning of the plug. The plug 11 is provided with a transverse opening 12 which constitutes the valve passage through which fluid passes when the passage 12 is brought to register with the pipe openings at either end of the valve. The body portion 10 is provided with two flanges 12*a* for the purpose of making pipe connections to the valve structure, only one flange being shown in the drawings. The upper portion of the body 10 is provided with a flange 13 which is suitably counterbored at 13*a* for the purpose of receiving a packing ring 14. The bottom of the counterbore 13*a* is so shaped that when pressure is applied upon ring 14, the ring tends to be forced against stem 11*a*. Surmounting flange 13 is a second flange 15 having formed thereon a gland 15*a* arranged to exert pressure upon the packing ring 14, pressure being applied by means of bolts 16. The end of gland 15*a* is so shaped that when pressure is applied upon packing ring 14 the ring is pressed against valve stem 11*a*, thereby making an effective seal against leakage of lubricant or other fluid.

Communicating with the bottom end of the opening in stem 11*a* is a transverse passage 17 passing entirely through the plug 11, and, communicating with the ends of passage 17, are grooves 17*a* and 17*b* formed in the seating surface of plug 11. These passages are for the purpose of distributing a suitable lubricant to the bearing surfaces of the valve and seat. Inserted within the central opening of stem 11*a* is a compressor plug 18 which is secured in position by screw threads as at 18*a*. Plug 18 is provided with a suitable threaded central opening into which is screwed a compressor screw 18*b*. The threaded central opening in plug 18 constitutes a reservoir for a suitable lubricant for the valve. The lower end of plug 18 is provided with a check-valve structure to prevent the egress of lubricant from the valve housing and comprises a ball 19 and a spring 20 holding the ball in position over a passage communicating with the threaded opening in plug 18; the check-valve elements being held in position in plug 18 by means of a pin 21 passing through the lower end of the plug 18.

The lower end of body 10 is provided with a flange 22 which is suitably recessed at 22*a* for the reception of a cover plate 23 provided with a shoulder 23*a* adapted to enter the recess 22*a*. Interposed between the flanges 22 and the plate 23 is a flexible plate 24 which is securely clamped between the elements 22 and 23 by suitable bolts 25. The lower end of plug 11 is provided with an extension 11*b* which is dove-tailed in cross-section, or is frusto-conical in shape with the large end extending downward. The plate 24 supports at its center a bearing element 25*d* having a complemental recess which engages and cooperates with the extension 11*b* on plug 11. The bearing element 25*d* is provided with a threaded stem 25*a* over which is threaded a nut 25*b* for securing the bearing element to plate 24. A spring diaphragm 26 is located within a recess 23*b* formed in plate 23 and is provided with a central opening for the reception of the lower end of the stem 25*a* of bearing element 25*d*. The relative location of the various elements is such that the diaphragm spring 26 exerts upward pressure against stem 25*a*, which in turn transmits the pressure to the plug 11 to cause the plug member to be securely seated within the housing.

The manner in which the extension 11*b* on plug 11 is inserted in bearing element 25*d* is illustrated in Figure 2. The bearing element 25*d* is provided on one side with a slot 25*c* sufficiently large to permit the entry of extension 11*b*; the two elements being assembled in proper relation before the assembly of the entire valve structure.

Plate member 24 is made of resilient material capable of being flexed, and may be neutral, or, if desired, act in a direction tending to keep the valve member 11 on its seat. The extension 11*b* on plug 11 is accurately machined to provide a snug fit in the bearing element 25*d*, only sufficient clearance being allowed to permit free rotation of the extension within the bearing element when the plug is rotated. Any appreciable flexing of plate 24 will result in an axial movement of plug 11 by virtue of the connection between bearing element 25*d* and extension 11*b*.

The operation of my invention is as follows:

As previously stated, plug 11 is normally kept rightly seated within body 10 by the action of diaphragm spring 26 upon bearing element 25*d*. Preliminarily, screw 18*b* is removed from plug 18 and a suitable fluid lubricant, such as grease, is introduced into the central opening of plug 18 by any suitable means such as a grease gun. The lubricant, under pressure, will fill the central opening of plug 18 and flow past check-valve 19 into passages 17, 17*a* and 17*b*. Since passages 17*a* and 17*b* communicate with the space between the lower end of the plug 11 and plate 24 this space will become filled with lubricant. Also the annular recess 10*a* near the top of body 10 will become filled with lubricant by leakage from between the surfaces of contact of the valve and seat. If desired, this preliminary filling of the valve with lubricant may be done before plate 24 is securely clamped to body 10 in order to permit the ready escape of air entrapped in the space between the plug 11 and plate 24, although this is not essential for the reason that air will escape in any event when the plug is raised from its seat.

When bolts 25 are securely clamped, the seal between plate 24 and body 10 is sufficiently tight to prevent the leakage of lubricant from the body. It will thus be seen that plate 24 constitutes a flexible wall portion of the body or housing of the valve structure. After the valve structure has been completely filled with lubricant the grease gun is removed and screw 18*b* replaced. Upon forcing the screw 18*b* into plug 18 the lubricant is subjected to considerable pressure which is transmitted through the various passages to act upon the walls of the housing 10, including the flexible plate 24. Since the vertical component of pressure of the lubricant upon plate 24 tends to cause a downward movement of the plate it will be seen that the action of the pressure upon the plate is to oppose the action of diaphragm spring 26 and, therefore, tends to unseat plug 11. By proper adjustment of the pressure of the lubricant by means of screw 18*b*, a balance can be obtained between the action of plate 24 and spring 26 whereby the plug 11 will be unseated and held in proper spaced relation with respect to its seat, the intervening space being filled with lubricant.

If it be desired to increase the action of plate 24 in unseating plug 11, it is only necessary to increase the effective area of plate 24 over which the pressure is applied. Obviously, this may be done by increasing the diameter of that portion of the plate which is exposed to pressure of the lubricant and is free to flex.

Instead of the frusto-conical shape of extension 11*b* employed in Figure 1, the extension may have the form shown in Figure 3. In this form the extension has a short cylindrical body provided with a flat fillister head. The construction of Figure 3 is otherwise the same as that shown in Figures 1 and 2.

In Figure 4, I have shown the lubricant compressor arrangement of Figure 1 as applied to an alternative valve structure. Corresponding elements in these figures are represented by the same reference characters. The valve structure in Figure 4 differs from that in Figure 1 only in the packing arrangement at the top of plug 11 to prevent the escape of lubricant. In the arrangement of Figure 4, the packing ring is a plain cylindrical ring of suitable material which lies in a cylindrical recess formed partly in the casing 10 and partly in plug 11. It will thus be seen, that in case the ring 14 be made of resilient material, the application of pressure upon gland 15*a* by means of screw 16 will compress the ring and tend to unseat plug 11. In the arrangement shown in Figure 4, it will be seen that the lower end of plug 18 is reduced in diameter, in order that the ends of pin 21 may extend beyond the surface of the plug, and may be bradded if desired, without interference with the walls of the opening in which plug 18 is inserted.

It is to be noted that the screw-compressor arrangement shown in Figures 1 and 4 is made in a unitary structure which greatly facilitates its removal for cleaning, repairing or renewal. This unitary arrangement of the compressor elements also greatly facilitates the assembly of the completed valve structure. Furthermore, this arrangement permits of the introduction of a larger quantity of lubricant than in the case where only a compression screw is employed.

Figure 5 is a view of the screw compressor assembly of Figure 1 as seen from the bottom end of the assembly. It will be noted that the upper end of plug 18 is provided with a portion in the form of a hexagonal nut to facilitate its assembly by means of a wrench.

Figure 6 illustrates a modified structure of a screw compressor for forcing lubricant into the valve structure. Parts corresponding to those shown in Figures 1 and 4 are indicated by like numerals. In this arrangement, the check-valve structure is not incorporated as a unitary structure in plug 18, but is mounted within a small central opening in stem 11*a*. The seat for the ball 19, however, is formed on the lower end of plug 18. The structure of Figure 6, is otherwise the same as that of Figure 4.

It is understood that the structural embodiment of my invention may assume various forms. For example, it is within the scope of my invention to arrange the elements in such a manner that the plate 24*a* shown in Figure 3*a* normally exerts an upper pressure on the plug 11*b*, thus permitting the diaphragm spring 26 to be dispensed with.

Having thus described my invention and illustrated its use what I claim as new and desire to secure by Letters Patent is:

1. In a valve structure, the combination of a valve housing provided with a valve seat and a valve member having engaging surfaces, means for supplying lubricant under pressure to the engaging surfaces of said valve and seat, and means operable by the pressure of said lubricant to cause said valve to partake of limited unseating movement.

2. In a valve structure the combination of a housing provided with a valve seat and a valve member having engaging surfaces, biasing means for holding said valve on its seat, means for supplying lubricant under pressure to the engaging surfaces of said valve and seat, and means operable by the pressure of said lubricant to oppose said biasing means and cause limited unseating movement of said valve member.

3. In a valve structure, the combination of a valve housing provided with a valve seat and a valve member cooperating therewith, means for supplying lubricant under pressure to said housing, and means operable by the pressure of said lubricant to cause said valve to partake of limited unseating movement.

4. In a valve structure the combination of a housing provided with a valve seat and a valve member cooperating therewith, biasing means for holding said valve on its seat, means for supplying lubricant under pressure to said housing, and means operable by the pressure of said lubricant to oppose said biasing means and cause limited unseating movement of said valve member.

5. In a valve structure the combination of a housing provided with a flexible wall portion and a valve seat, a valve seated upon said seat each having engaging surfaces and secured to said flexible wall portion, means for supplying lubricant under pressure between the engaging surfaces of the valve and for subjecting the flexible wall portion to pressure of the lubricant, whereby said wall portion partakes of limited movement to unseat said valve.

6. A valve structure comprising a housing provided with a valve opening, a rotatable valve element mounted in said housing and adapted to cover and uncover said opening, a flexible plate forming a portion of the wall of said housing, said rotatable valve element being secured to said plate by an anchor bearing to permit free rotation of said valve and to cause said valve to partake of axial movement upon flexure of said plate a stem extending from the valve at the end opposite to said flexible plate, and lubricant containing means in said stem.

7. A valve structure comprising a housing provided with a valve opening, a rotatable valve element mounted in said housing and adapted to cover and uncover said opening, a flexible plate forming a portion of the wall of said housing, said rotatable valve element being secured to said plate by an anchor bearing to permit free rotation of said valve and to cause said valve to partake of axial movement upon flexure of said plate and means for supplying lubricant under pressure to said housing whereby said plate becomes flexed and unseats said valve.

8. A valve structure comprising a housing provided with a valve opening, a rotatable valve element mounted in said housing and adapted to cover and uncover said opening, a flexible plate forming a portion of the wall of said housing, said rotatable valve element being secured to said plate by an anchor bearing to permit free rotation of said valve, said plate being spaced from said valve element and a portion of a side wall of said housing, and means for supplying lubricant under pressure to the space between said valve element and plate for establishing a sufficient vertical component of force between said plate and said side wall to flex the plate and thereby unseat said valve.

9. A valve structure comprising a housing provided with a valve opening, a rotatable valve element mounted in said housing and adapted to cover and uncover said opening, a flexible plate forming a portion of the wall of said housing, said rotatable valve element being secured to said plate by an anchor bearing to permit free rotation of said valve and to cause said valve to partake of axial movement upon flexure of said plate, said plate normally tending to hold said valve on its seat and means for supplying lubricant under pressure to said housing whereby said plate is flexed against its normal tension and thereby unseats the valve.

10. In a valve structure the combination of a housing provided with a flexible wall portion and a valve opening, a rotatable valve seated over said opening, means for securing said valve element to said flexible wall portion whereby said valve may be unseated by flexure of said wall but is free to be moved from over said opening, and a stem for rotating said valve extending from the end opposite to said flexible wall.

11. A valve structure comprising a housing provided with a valve opening, a rotatable valve element mounted in said housing and adapted to cover and uncover said opening, a flexible plate forming a portion of the wall of said housing, said rotatable valve element being secured to said plate by an anchor bearing to permit free rotation of said valve and to cause said valve to partake of axial movement upon flexure of said plate, a removable closure for the valve housing having a portion engaging the periphery of the flexible plate for retaining the same and forming a seal to prevent the escape of lubricant, and means for supplying lubricant under pressure to said housing whereby said plate becomes flexed and unseats said valve.

12. In a valve structure, in combination, a valve housing or casing member having a tapered valve seat, and a tapered valve member engaging said seat, one of said members being provided with a transversely arranged groove adapted to receive lubricant for the surface of contact of the valve and casing, means for normally holding the said valve on its seat, means for lubricating said valve including a lubricant chamber and means therein for forcing lubricant under pressure preliminary to the surface of contact of said valve and seat adjacent to said chamber, thence to said transversely disposed groove, to thereby distribute the lubricating fluid upon the adjacent surfaces of the valve and seat, and means separate from said lubricant chamber, for confining some of the lubricant thus placed under pressure for acting on one end of said valve for displacing it longitudinally of its seat, such preliminary lubricating facilitating such displacement of the valve upon pressure of lubricant acting on said valve end.

13. In a valve structure, in combination, a valve housing or casing member having a tapered valve seat, and a tapered valve member engaging said seat, one of said members being provided with a transversely arranged groove adapted to receive a lubricant for the surface of contact of the valve and casing, means for normally holding the said valve on its seat, means at one end of the valve structure for lubricating said valve including a lubricant chamber and means therein for forcing lubricant under pressure preliminarily to the surfaces of contact of said valve and seat adjacent to said chamber, thence to said transversely disposed groove, to thereby distribute the lubricating fluid upon the adjacent surfaces of the valve and seat, and means located at the opposite end of the valve structure for confining some of the lubricant thus placed under pressure for acting on one end of said valve for displacing it longitudinally of its seat, such preliminary lubricating facilitating such displacement of the valve upon pressure of lubricant acting on said valve end.

14. In a device of the character described, in combination, a casing having a passageway for fluid and a valve seat, a tapered valve member engaging said seat and lubricant passageways in the surface of contact of said valve and casing, a lubricant chamber in said valve member communicating with said lubricant passageways, a compression chamber adjacent to said valve member and in communication with said lubricant chamber, and a pressure responsive element in said compression chamber for lifting the valve member from its seat upon compression of the lubricant in said compression chamber.

15. In a device of the character described, in combination, a casing having a passageway for fluid and a valve seat, a tapered valve member engaging said seat and lubricant passageways in the surface of contact of said valve and casing, a lubricant chamber in said valve member communicating with said lubricant passageways, a compression chamber adjacent to said valve member and in communication with said lubricant chamber, means for compressing the lubricant in both of said chambers, and a pressure responsive element in said compression chamber for lifting the valve member from its seat upon compression of the lubricant in said compression chamber.

16. In a device of the character described, in combination, a valve housing or casing having a valve seat, and a valve member engaging said seat, means for normally holding said valve on its seat, means for lubricating said valve by forcing lubricant under pressure thereto, and means operated by said pressure and acting on one end of said valve for lifting it from its seat.

17. In a valve structure, a body member having an inflow and an outflow passage, a tapered plug rotatable within said body and having a port adapted to register with said passages when the plug is in open position, said valve structure having a lubricant receiving chamber in its larger end, means independent of said lubricant receiving chamber for placing lubricant under pressure in said valve structure, means for lubricating the surfaces of contact of the valve and casing including longitudinally and transversely arranged grooves in said surfaces of contact, said transverse groove being located at the smaller end of the valve member adjacent to said means for placing said lubricant under pressure and being in communication with said chamber through said longitudinal groove, means for conducting the lubricant to said surfaces under pressure preliminarily adjacent to the means for placing the lubricant under pressure, and thence to said transverse groove whereby to initially lubricate said surfaces.

18. In a valve structure, a body member having an inflow and an outflow passage, a tapered plug rotatable within said body and having a port adapted to register with said passages when the plug is in open position, said valve structure having a lubricant receiving chamber at one end, means at the opposite end of said valve structure for placing lubricant under pressure in said valve structure, means for lubricating the surface of contact of the valve and casing including longitudinally and transversely arranged grooves in said surface of contact, said transverse groove being located adjacent to said means for placing said lubricant under pressure and so arranged that lubricant under pressure therein will tend to move the valve relatively to its seat, said groove being in communication with said chamber through said longitudinal groove, means for preliminarily conducting the lubricant to said surface adjacent to the means for placing the lubricant under pressure, and thence under pressure to said transverse groove whereby to initially lubricate said surface and to tend to move the valve relatively to its seat.

19. In a valve structure, a valve casing having a tapered valve seat, a tapered valve member engaging said valve seat and grooves for conducting lubricant to the seating surfaces thereof, means at the smaller end of the valve seat for introducing lubricant into said grooves, a chamber for fluid at the larger end of said valve seat, a movable diaphragm in said chamber connected to said valve member, yieldingly resistant means tending to move the diaphragm and thereby said valve member onto its seat and permitting movement thereof in another direction in response to pressure established in said chamber by the introduction of lubricant into said chamber through said grooves.

20. In a plug valve, in combination, a casing having a tapered valve seat, a rotatable tapered valve member engaging said seat, a chamber at one end of said valve seat, a swivel plate in said chamber engaging said valve member, and a flexible diaphragm connecting said plate to a part of said casing, said diaphragm being of greater effective area than the adjacent end of said valve member so that pressure established in said chamber acting between the diaphragm and casing will cause the valve to be moved from its seat, said diaphragm normally tending to hold the valve on its seat.

21. In a valve structure, in combination, a casing having a tapered valve seat, a chamber adjacent to said valve seat, a tapered valve member engaging said seat, a diaphragm in said chamber positively connected to said valve member, and yieldingly resistant means acting upon and tending to move said diaphragm in one direction to hold the valve on its seat, said diaphragm being substantially immovable normally in the opposite direction, but responsive to lubricant pressure to move said valve.

22. In a valve structure, in combination, a casing having a tapered valve seat, a chamber adjacent to said valve seat, a tapered valve member engaging said seat, a diaphragm in said chamber connected to said valve member, and means for introducing lubricant under pressure into said chamber to act against said diaphragm for moving said valve relatively to its seat.

23. A valve comprising a casing having a seat therein, a plug positioned in operative relation to said seat, means for maintaining the plug in seated operative position, said means including a flexible metallic closure for the casing secured thereto and carrying means contacting with one end of the plug and forming a bearing therefor, and means extending from the other end of the plug adapted to be engaged to effect turning of the plug.

24. A valve comprising a casing having a tapered seat therein a tapered plug rotatably supported in the seat, and means for maintaining the plug seated, said means including a flexible plate closing the end of the casing at the larger end of the plug, and carrying means contacting with the end of the plug.

25. A valve comprising a casing having a seat therein, a plug rotatably supported in the seat, a flexible plate closing one end of the valve seat, and a threaded member disposed at the central portion of the flexible plate and bearing upon the plug for maintaining the plug seated.

26. A valve comprising a casing having a tapered seat therein, a tapered plug rotatably supported in the seat, a flexible plate closing the large end of the valve seat a threaded member disposed at the central portion of the flexible plate and bearing upon the plug for maintaining the plug seated, and means forming a seal at the junction of the threaded member and the plate.

27. A valve comprising a casing having a seat therein, a plug rotatably supported in the seat, a flexible plate closing one end of the valve seat, a threaded member disposed at the central portion of the flexible plate and bearing upon the plug for maintaining the plug seated, and means forming a seal at the junction of the threaded member and the plate.

28. In a valve structure, the combination of a valve casing having a seat and a valve member rotatable in said seat, a flexible closure for one end of said valve seat and secured to the casing, and means carried by said closure contacting with one end of the valve member in all positions thereof to normally maintain the valve member in seated operative position.

29. A valve comprising a casing having a tapered seat extending from an opening at the end of the casing adjacent the larger end of said seat, a tapered plug rotatably supported on said seat and a resilient metal closure sealing said opening in the casing and acting upon the plug to yieldingly urge it toward said seat.

30. A valve comprising a casing having a tapered seat extending from an opening at the end of the casing adjacent the larger end of said seat, a tapered plug rotatably supported on said seat, and a resilient metal closure rigidly secured at its edges for sealing said opening in the casing and acting upon the plug, the body of said closure being free to flex and yieldingly urge the plug toward its seat.

31. A valve comprising a casing having a tapered seat therein, a tapered plug rotatably supported in the seat, a flexible plate closing the end of the casing at one end of the plug, means carried by said plate and engaging said plug over a limited area centrally of the adjacent end thereof to provide a bearing for rotation of said plug.

JESSE C. MARTIN, Jr.